(12) United States Patent
Stotka

(10) Patent No.: US 7,454,811 B1
(45) Date of Patent: Nov. 25, 2008

(54) CROSS-DOCK SYSTEM

(76) Inventor: Christopher Lon Stotka, 783 Magellan Way, Napa, CA (US) 94559

( * ) Notice: Subject to any disclaimer, the term of this patent is extended or adjusted under 35 U.S.C. 154(b) by 0 days.

(21) Appl. No.: 11/333,821

(22) Filed: Jan. 17, 2006

(51) Int. Cl.
*E01D 1/00* (2006.01)
(52) U.S. Cl. ........................................ 14/69.5
(58) Field of Classification Search .................. 14/69.5; 182/141
See application file for complete search history.

(56) References Cited

U.S. PATENT DOCUMENTS

| | | | | |
|---|---|---|---|---|
| 1,646,725 A | * | 10/1927 | Davidson | 52/690 |
| 2,644,180 A | * | 7/1953 | Eycleshimer | 14/69.5 |
| 2,882,644 A | * | 4/1959 | Bonanno et al. | 446/3 |
| 3,081,601 A | * | 3/1963 | Fentiman | 405/221 |
| 3,106,826 A | * | 10/1963 | Freidel et al. | 405/218 |
| 3,261,489 A | * | 7/1966 | Miles | 414/607 |
| 3,352,438 A | * | 11/1967 | Davidson | 414/333 |
| 3,881,206 A | * | 5/1975 | Christensen | 14/69.5 |
| 3,999,397 A | * | 12/1976 | Albery | 405/218 |
| 4,076,134 A | * | 2/1978 | Landow | 414/333 |
| 4,572,328 A | * | 2/1986 | Benko | 182/1 |
| 5,214,817 A | * | 6/1993 | Allen | 14/69.5 |
| 5,408,790 A | * | 4/1995 | Hoesten et al. | 52/263 |
| 6,223,855 B1 | * | 5/2001 | Lindner | 182/131 |
| 6,526,614 B2 | * | 3/2003 | Anderson et al. | 14/69.5 |

* cited by examiner

*Primary Examiner*—Gary S Hartmann
(74) *Attorney, Agent, or Firm*—Risto A. Rinne, Jr.

(57) ABSTRACT

An apparatus for the loading and unloading of railroad boxcars includes a first platform assembly that abuts the boxcar and a second platform assembly that abuts the first platform assembly and is secured thereto. The height of the first platform assembly is adjustable proximate the boxcar. The height of the second platform corresponds to that of a tractor-trailer's floor. A ramp allows a forklift to drive up onto and down off of the two platforms. Safety rails prevent the forklift from driving off of any raised portion of the apparatus. A trailer intermediate plate allows the forklift to pass onto the floor of the tractor-trailer and an intermediate plate allows the forklift to pass onto the floor of the boxcar. The apparatus includes three main component parts (the first and the second platform and the ramp) that are each adapted for lifting and movement by the forklift. The apparatus is portable for temporary use where desired, can be disassembled, moved, and used elsewhere.

17 Claims, 2 Drawing Sheets

CROSS-DOCK SYSTEM

BACKGROUND OF THE INVENTION

1. Field of the Invention

The present invention, in general relates to railroads and, more particularly, to unloading railroad cars.

It is necessary to unload cargo from railroad boxcars and transfer the contents to trucks, such as tractor-trailer trucks, also known as "eighteen wheel" trucks, and other similar vehicles.

To handle the weight, concrete docks, also known generally as "cross-docks" are used. The cross-dock allows unloading of the railroad box cars by forklift at one side and transfer of the cargo to a truck trailer at another side. It is necessary for the dock to bear the weight of the forklift plus cargo. Therefore, it has to be strong. Concrete is the only known viable prior-art way of building a cross-dock.

Sometimes, the need for unloading boxcars is temporary or intermittent. In such instances there is no need for a permanent installation of a cross-dock. However, there has been no previously known way of providing a portable cross-dock system that is both structurally sound and which can be effectively moved from place to place.

Also, for certain work areas it is not permissible to build and permanently leave a cross-dock system in place. Sometimes, because of the needs of the project at hand, the cross-dock must be built at substantial cost, used for a period of time, and then torn down and destroyed after it has served its purpose. The debris must then be hauled away, also at significant expense.

Accordingly, there exists today a need for a portable cross-dock system that helps to ameliorate the above-mentioned difficulties and also those that are briefly mentioned in the objects, hereinafter.

Clearly, such a system would be especially useful and desirable.

2. Description of Prior Art

Concrete cross-docks are, in general, known. While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a portable cross-dock system that can be assembled in situ.

It is also an important object of the invention to provide a portable cross-dock system that can be assembled in a desired position, used, and then disassembled and removed.

Another object of the invention is to provide a portable cross-dock system that can be assembled in a desired position, used, disassembled, moved to a new location, and then reassembled and reused at the new location.

Still another object of the invention is to provide a portable cross-dock system that is economical to use.

Still yet another object of the invention is to provide a portable cross-dock system that can be disassembled into component parts that can each be transported by forklift.

Yet another important object of the invention is to provide a portable cross-dock system that is safe to use.

Still yet another important object of the invention is to provide a portable cross-dock system that can support the weight of a forklift and a cargo.

A first continuing object of the invention is to provide a portable cross-dock system that permits forklift access to boxcars having various floor-heights.

A second continuing object of the invention is to provide a portable cross-dock system that can accommodate different rail types.

A third continuing object of the invention is to provide a portable cross-dock system that can accommodate different boxcar types.

A fourth continuing object of the invention is to provide a portable cross-dock system that permits loading of cargo from a boxcar into a trailer that is disposed on an opposite side of the cross-dock system as compared to that of the boxcar.

A fifth continuing object of the invention is to provide a portable cross-dock system that permits loading of cargo from a boxcar into a trailer that is disposed on an adjacent side of the cross-dock system as compared to that of the boxcar.

A sixth continuing object of the invention is to provide a portable cross-dock system that includes a ramp.

A seventh continuing object of the invention is to provide a portable cross-dock system that includes a ramp that can be located where desired.

An eighth continuing object of the invention is to provide a portable cross-dock system that includes safety rails to prevent a forklift from accidentally driving off of a platform of the cross-dock.

A ninth continuing object of the invention is to provide a portable cross-dock system that includes means for interconnecting a pair of platforms together.

A tenth continuing object of the invention is to provide a portable cross-dock system that permits the simultaneous loading of two truck trailers from the cross-dock system.

An eleventh continuing object of the invention is to provide a portable cross-dock system that is economical to manufacture.

A twelfth continuing object of the invention is to provide a portable cross-dock system that is economical to use.

A thirteenth continuing object of the invention is to provide a portable cross-dock system that is more economical to use at a particular location for a period of time, disassemble, transport, and use elsewhere at a second location than it would be to construct and maintain two or more separate fixed-in-position types of cross-docks at each separate location.

A fourteenth continuing object of the invention is to provide a portable cross-dock system that is sufficiently strong, locks together, is safe, and which does not contain any component part that exceeds a predetermined maximum weight.

A fifteenth continuing object of the invention is to provide a portable cross-dock system that is sufficiently strong, locks together, is safe, and which does not contain any component part that exceeds four-thousand pounds in weight.

A sixteenth continuing object of the invention is to provide a portable cross-dock system that includes members for a forklift to lift a platform at a balance point.

A seventeenth continuing object of the invention is to provide a portable cross-dock system that includes members that do not exceed a predetermined maximum length.

An eighteenth continuing object of the invention is to provide a portable cross-dock system that includes a plurality of adjustable length (height) legs on one side of a platform of the cross-dock system.

Briefly, a portable cross-dock system that is constructed in accordance with the principles of the present invention has a pair of platforms that are eight feet wide by sixteen feet long that are joined together at the longer dimension. An eight foot by twenty foot ramp allows forklift access up to the platforms. A support system provides load distribution for the platforms. Truck access is provided on one side of the platforms and railroad boxcar access is provided on another side. An adjustable height is provided to the platform at the boxcar access area to accommodate different height boxcars. Safety rails prevent the forklift from accidentally driving off of the platforms. Other elements are described hereinafter in the detailed description of a preferred embodiment thereof.

DETAILED DESCRIPTION OF THE INVENTION

Figure 1:
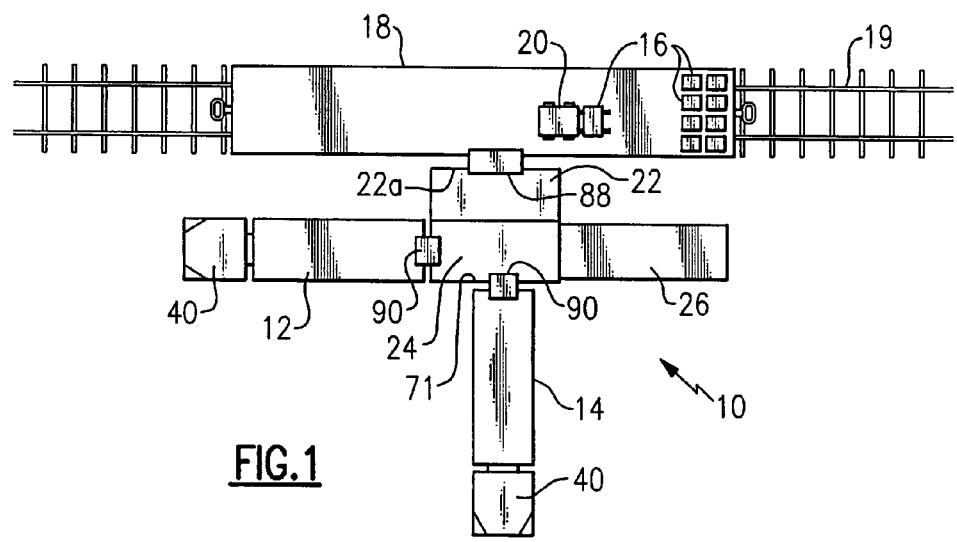
FIG. 1 is top plan view of a portable cross-dock system.
Figure 2:
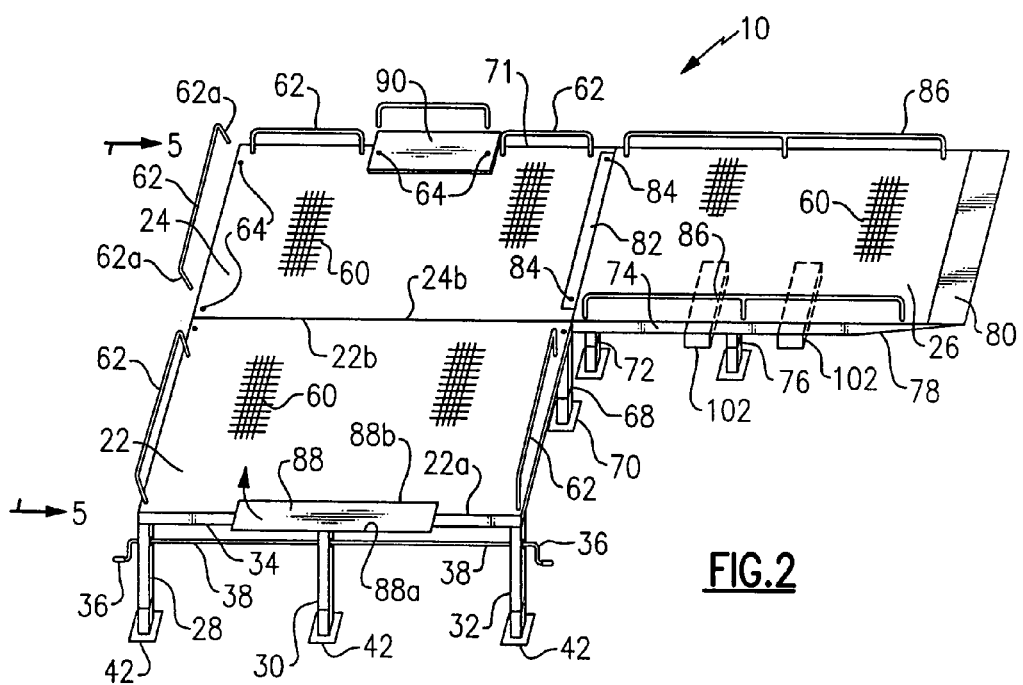
FIG. 2 is a view in perspective the cross-dock system of FIG. 1 with a ramp disposed on an opposite side thereof.

Referring on occasion to all of the drawing figures and now, in particular, to FIG. 1 and FIG. 2 is shown, a portable cross-dock system, identified in general by the reference numeral 10.

The cross-dock system 10 shows a first truck trailer 12 and a second truck trailer 14 being simultaneously loaded with cargo 16 that is being removed from inside of a boxcar 18 by a forklift 20. The boxcar 18 is on a train track (rails) 19. A first platform 22 is disposed adjacent the boxcar 18 (a few inches away) and a second platform 24 is disposed adjacent the two trailers 12, 14. The first platform 22 and the second platform 24 are connected together along a longer dimension thereof, as is described in greater detail hereinafter.

A ramp 26 extends from an upper surface of the second platform 24 to the ground and is used for access by the forklift 20 and by foot traffic, as well.

Because the height of the train track 19 rails above the ground is a variable, as is the height of the floor of the boxcar 18 with respect to the bottom of its wheels (i.e., its height above the top of the track 19) a boxcar side 22a of the first platform that is in contact with the boxcar 18 must be of adjustable height (unless only a known type of boxcar 18 is used) with respect to the ground surface. Refrigerated boxcars 18 tend to have a higher floor height than other types. Ideally, the boxcar side 22a can vary from 42-46 inches.

A set of three jacks 28, 30, 32 are attached (welded or bolted) to a structural beam member 34. The jacks 28, 30, 32 are adjusted in height by a crank 36 on either side and by a crank rod 38 that interconnects all of the jacks 28, 30, 32. The jacks 28, 30, 32 are similar or identical to those commonly used on the fronts of the trailers 12, 14 and are well known for supporting the front of the trailers 12, 14 when they are separated from a truck 40. The jacks 28, 30, 32 are permanently attached to the beam member 34 and include bottom plates 42 that help distribute the load onto the surface.

In use, the surface of the ground it prepared to receive the weight of the cross-dock system 10. Preparation can vary greatly, depending on the nature of the surface. If the surface is a type of soil or other material that is well suited to bear the weight, little preparation other than grading is required. If the soil has a compaction rate that is not sufficient, small concrete footings (not shown) may be provided for use under each of the bottom plates 42 and for any other load bearing portions of the cross-dock system 10.

The crank 36 on either side is rotated until the boxcar side 22a of the first platform 22 is at the same height as the floor inside of the boxcar 18. When the crank 36 is rotated, all three jacks 28, 30, 32 change their height simultaneously, thereby uniformly raising or lowering the boxcar side 22a.

There is a minimum effective combined size for the two platforms 22, 24 to permit adequate movement by the forklift 20. However, it is desirable that the disassembled weight of any component part of the cross-dock system not exceed four-thousand pounds, to permit use of the forklift 20 for its loading for transport. Still, the cross-dock system 10, when assembled, must support the weight of the cargo and of the forklift 20. Those benefiting from this disclosure will, of course, be able to modify details of construction.

The overall width as shown by arrow 44 of each of the platforms 22, 24 is eight feet and the overall length as shown by arrow 46 is sixteen feet. The perimeter of each includes two end beams 48, 50 and two longitudinal beams 52, 54 that are welded together. A center longitudinal beam 56 is parallel to the longitudinal beams 52, 54 and extends between the two end beams 48, 50 and is welded thereto. Fourteen shorter spaced-apart interconnecting beams 58 (seven on each side of the center longitudinal beam 56) are attached and provide support for a grating 60 that is disposed thereon and attached (i.e., welded as desired). All of the beams 48-58 are preferably I-beams of sufficient size and strength.

Different types of grating 60 can be used and include non-porous (solid) planar sheets such as "diamond plate" to more open types having serrated surfaces and openings therethrough. For example, if snow or ice is anticipated a more open type of grating 60 is preferred.

A two-inch diameter schedule-40 steel tubing is preferred for a plurality of safety rails 62. The safety rails 62 are of any preferred length and are detachably-attachable with respect to the platforms 22, 24. The safety rails each include a pair of vertical members 62a that are adapted to extend through holes 64 provided in a surface of the first platform 22 and the second platform 24. The vertical members 62a each enter into one of a plurality o of sockets 66 that are disposed under the holes 64. The sockets 66 are attached along the perimeter longitudinal beams 52, 54 and the end beams 48, 50, except where access to the boxcar 18 at the boxcar side 22a is desired.

Cross-bracing 61 is used as desired between fixed support members 68 and the longitudinal beams 52, 54 or end beams 48, 50. Load distributing plates 70 are disposed at the bottom of the fixed support members 68. The load distributing plates 70 are placed on suitable soil or on footings that are provided at the site.

The primary difference between the first platform 22 and the second platform 24 is that the first platform 22 includes three of the jacks 28, 30, 32 on the boxcar side 22a instead of three more of the fixed support members 68 to permit varying its height.

The height of the second platform 24 is preferably fixed at or near 51 inches above the ground surface to accommodate the usual floor height of the tractor trailers 12, 14. If desired, three more of the jacks 28, 30, 32 could be used to make the height of a trailer side 71 of the cross-dock system 10 adjustable.

Figure 3:
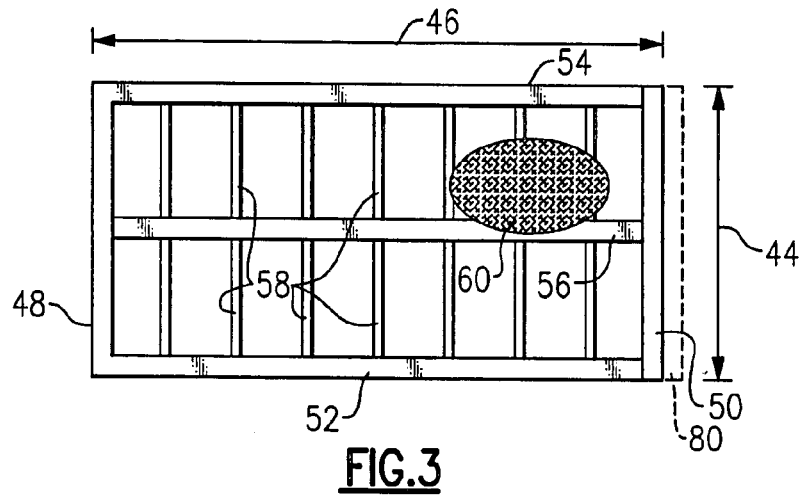
FIG. 3 is a top plan view of a second platform and is also applicable for the ramp of the cross-dock system of FIG. 1.

Referring again primarily to FIG. 3 and also to FIG. 2, the ramp 26 is similar in construction to the second platform 24 except that it includes a pair of fixed upper supports 72 (one shown) that are angled to match the tilt of the a pair of spaced apart modified longitudinal beams 74 (one shown).

A pair of fixed intermediate supports 76 (one shown) provide support for the center area of the modified longitudinal beams 74. The modified longitudinal beams 74 include a tapered end 78 at an end opposite where the fixed upper supports 72 are disposed. The tapered end 78 allows a twelve inch extension skit plate 80 (dashed lines in FIG. 3) to be disposed on the ground surface to allow easy access by the forklift 20.

The ramp 26 can simply be placed as a free-standing unit that abuts either the first platform 22 or the second platform 24 where preferred. If desired, the ramp 26 can include an attachment plate 82 that is attached to the ramp 26 and extends there-from over the second (or first) platform 24. Pins 84 can be used that pass through holes in the attachment plate 82 and secure it to the second platform 24.

Ramp safety rails 86 can be detachable (as was previously described for the safety rails 62) or permanently attached to the sides of the ramp 26, as desired. The ramp safety rails 86 and the safety rails 62 provide a raised perimeter obstruction that prevents the forklift 20 from accidentally driving off any elevated portion of the cross-dock system 10 and causing possible damage to the forklift 20 or possibly injury or even death to its operator.

An intermediate plate 88 is attached to the boxcar side 22*a* of the first platform 22, and is preferably hingedly attached thereto. The intermediate plate 88, along with the entire boxcar side 22*a*, are lowered so that a first side 88*a* of the intermediate plate 88 is disposed on the floor of the boxcar 18 and an opposite second side 88*b* is or remains disposed on the first platform 22.

A trailer intermediate plate 90 is preferably detachably-attachable to the second platform 24 where desired, at a location that does not include the safety rails 62. The trailer intermediate plate 90 may include protrusions that extend into the holes 64 and secure it where desired along the perimeter of the cross-dock system 10.

Accordingly, any of the safety rails 62 of the second platform 24 can be removed where desired and the trailer intermediate plate 90 can be used to provide a smooth planar transition surface to load the cargo 16 into the trailers 12, 14.

Because access to the cross-dock system 10 by the trailers 12, 14 may be limited due to a lack of clearance or other obstructions, it is important to allow loading of the trailers 12, 14 wherever along the perimeter of the cross-dock system 10 is deemed to be convenient. Certain locations where the cross-dock system 10 is used may have ample room for maneuvering the trailers 12, 14 whereas other locations may be far more limited.

Versatility as to where the trailers 12, 14 are loaded is essential to providing a high-degree of portability for the cross-dock system 10. The trailers 12, 14 can abut the second platform 24 on any of three sides or the first platform 22 on either of two opposite sides. Variability as to the location of the ramp 26 also provides a valuable benefit in that it permits selection of the preferred location(s) for loading the trailer(s) 12, 14 and then the ramp 26 is placed at whatever location remains.

Having versatility in this regard provides another unexpected benefit in that it also permits the simultaneous use of a plurality of the trailer intermediate plates 90. This, in turn, allows for the simultaneously loading of a plurality of the trailers 12, 14, thereby shortening the time required to unload the boxcar 18 and providing an increase in throughput.

It is important to secure the first and second platforms 22, 24 together. A variety of possible ways of doing so includes the use of the safety rails 62 so that one end of a safety rail 62 extend across and engage with holes 64 and sockets 66 in each of the platforms 22, 24. Other interconnecting pins can be designed for this purpose, as well.

Figure 5:
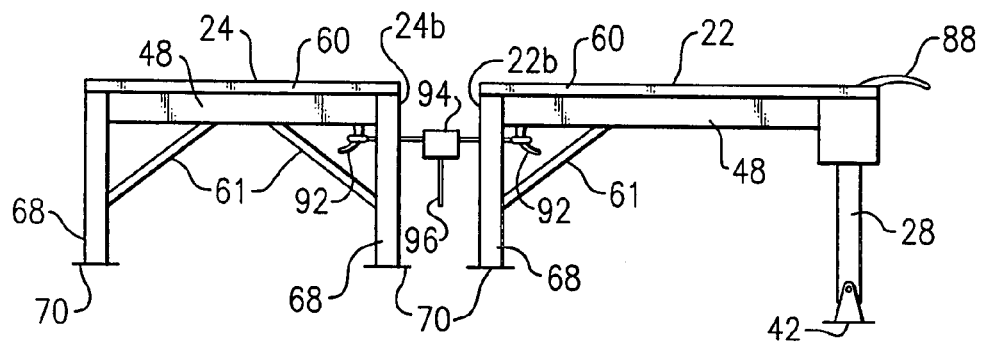
FIG. 5 is a side view of the cross-dock system of FIG. 2, absent the safety rails, taken along the line 5-5 therein.

Referring now to FIG. 5, a preferred way of securing the first and second platforms 22, 24 so that they are adjacent each other along a inside side 22*b*, 24*b* of each includes the use of attachment members 92 to be welded (attached) in pairs where desired to an underside of the platforms 22, 24. One of each pair of the attachment members 92 is attached proximate the inside side 22*b* of the first platform and the other is attached proximate the inside side 24*b* of the second platform 24 so that they are in alignment with each other.

A preferred type of a "come-along" 94 is secured at opposite ends thereof to one of the pair of attachment members 92 and is used to urge the two inside sides 22*b*, 24*b* closer together until they are disposed tightly against each other.

A preferred type of the come-along 94 includes a lever 96 and threaded members that, when the lever 96 is urged back and forth, draw the opposite ends together as well as the two platforms 22, 24.

It is important for the forklift 20 to be able to safely raise and move each platform 22, 24 which are the larger and heavier component parts of the cross-dock system 10.

If an unskilled forklift 20 operator (not shown) were to pick up these heavier component parts in the wrong way, for example way out of balance, there is danger that they could create an imbalance and possibly fall off of the forklift 20.

Figure 4:
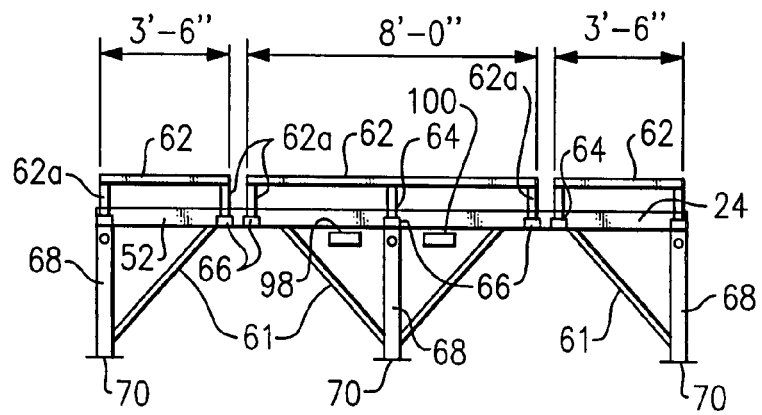
FIG. 4 is a rear elevation view of the second platform.

A pair of forklift members 98, 100 (FIG. 4) are preferably attached to each platform 22, 24 at a balance point. The forklift members 98, 100 include rectangular stock of a predetermined length that is selected to allow the "forks" of the forklift 20 to enter therein. The forklift members 98, 100 are welded or otherwise suitably attached to the platforms 22, 24.

Once engaged by the forks of the forklift 20, each of the platforms 22, 24 can be lifted by the forklift (one at a time) and transported where desired, typically unto the bed of a flat bed trailer (not shown) for transport of the cross-dock system 10 to another location.

To assemble cross-dock system 10 for use, the first platform 22 is placed by the forklift 20 adjacent the track 19. The second platform 24 is placed as close as possible to the first platform 22 so that the inside sides 22*b*, 24*b* of each are parallel and close together. A plurality (preferably two or three) of the come-alongs 94 are opened a sufficient amount and the opposite ends of each are attached to a pair of the attachment members 92. Each come-along 94 is then tightened a small amount and the process is repeated until the two platforms 22, 24 are held tightly together.

A sufficient quantity of the safety rails 62 are attached where required. One of the trailer intermediate plates 90 is attached wherever the safety rails 62 have been omitted and a gap in railing occurs. This is wherever a rear of one of the trailers 12, 14 is to be disposed.

The ramp 26 is transported by the forklift 20 and placed so that an upper portion of the ramp 26 is disposed adjacent to the first platform 22 or the second platform 24, where desired. The ramp 26 preferably also includes a modified pair of the forklift members 102 (FIG. 2) at a balance point. The modified forklift members 102 include openings of sufficient size to permit the forks of the forklift 20 to enter into them, even when the ramp 26 is disposed at an angle. The ramp 26 is secured to the first or second platform (22, 24) as desired.

After arrival of the boxcar 18 and the trailers 12, 14, the intermediate plate 88 is attached to the first platform 22 (if it is detachable) so that it engages with the floor of the boxcar 18. The trailer intermediate plate(s) are also attached where needed.

The forklift 20 drives up the ramp 26, onto the second platform 24 (or the first platform 22), across and over the intermediate plate 88 and into the boxcar 18. The cargo 16 is lifted by the forks and transported out of the boxcar 18, unto the first platform 22, onto the second platform 24, and over the trailer intermediate plate 90 and into one of the trailers 12, 14, where the cargo 16 is unloaded. This process is repeated until the boxcar 18 has been unloaded.

The process for use of the cross-dock system 10 to unload the cargo 16 from the boxcar 18 has been described. Of course, the process can be reversed and the cargo 16 can be loaded from the trailers 12, 14 into the boxcar 18 for storage in the boxcar 18 or transport by rail 19, as desired.

Accordingly, a portable cross-dock system 10 is provided for loading and unloading railroad boxcars 18 (or other types of railroad cars) that is safe, strong, inexpensive (when compared to permanent types of cross-docks), portable over the highway, easy to assemble and disassemble, adjustable as to the floor height of the boxcar 18, and versatile as to where the ramp 26 is placed and also as to where a trailer 12 or 14 can be loaded. Also, a plurality of the trailers 12, 14 can be used simultaneously.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A portable cross-dock system, comprising:
  (a) a first platform including a first side that is disposed parallel to a railroad track, adjacent to said railroad track, and sufficiently close to said railroad track to allow access to a railroad car, and wherein said cross-dock system is not disposed at a longitudinal end of said railroad car;
  (b) and wherein said first platform includes a surface that is disposed above a ground surface,
  (c) and wherein said first platform includes an area that is adapted to provide access to a rear of a tractor-trailer;
  (d) and wherein said first side includes means for adjusting a height of said first side above said ground surface to match the height of a floor of said railroad car;
  (e) and wherein said first platform includes ground support means for supporting the weight of a forklift and a cargo that is being carried by said forklift when said forklift is disposed on said first platform, said ground support means including means for distributing the weight of said first platform to said ground surface and wherein said ground support means is attached to said first platform, and
  (f) wherein the weight of said first platform is capable of being carried by said forklift;
  (g) and wherein said first platform includes a second side that is perpendicular with respect to said first side, a third side that is equal in length to said second side and wherein said third side is disposed apart from and parallel with respect to said second side and wherein said third side is perpendicular with respect to said first side, and a fourth side that is parallel with respect to said first side and disposed away from said first side by an amount equal to the length of said second side, and wherein any of said second side, said third side, and said fourth side are able to provide an interface for access into an open end of a trailer of the type used with a tractor-trailer by said forklift; and
  including a plurality of fixed supports, each of said fixed supports extending vertically down from said first platform, and wherein each of said fixed supports includes a load distributing plate that is disposed at a bottom of said fixed support, and wherein said load distribution plate includes an area that is in contact with said ground surface that is greater than an area of a bottom end of said fixed support, and wherein each of said fixed supports distributes the weight of said first platform through said load distributing plate directly to said ground surface that is disposed under each of said fixed supports, and including cross-bracing, each of said cross-bracing being attached at one end thereof to one of said fixed supports and at an opposite end thereof to a structural member that is an integral part of said first platform,
  and including at least one safety rail that is disposed along a perimeter of said first platform, except for where access to said railroad car is provided and where access to said rear of said tractor trailer is provided, said at least one safety rail including a raised portion that is disposed above said surface of said first platform that prevents said forklift from driving off of any portion of said first platform that is elevated above said ground surface, and including holes through said surface of said first platform and including sockets disposed below said holes, and wherein each of said safety rails include a pair of vertical members and wherein each of said vertical members is adapted to pass through one of said holes and to enter into one of said sockets, and wherein each of said safety rails is secured to said cross-dock system without a need for bolts, nuts, or other fasteners;
  and wherein said means for adjusting a height of said first side above said ground surface includes a plurality of jacks, and wherein said plurality of jacks include a crank and a member that connects said crank to each of said plurality of jacks sufficient to simultaneously change the position of all of said plurality of jacks when said crank is rotated.

2. The cross-dock system of claim 1 wherein said weight of said first platform does not exceed four-thousand pounds.

3. The cross-dock system of claim 1 including a ramp, said ramp disposed adjacent to said first platform and including an upper portion that is disposed at an elevation above said ground surface that is equal to that of said surface of said first platform and including a lower portion that is disposed at said ground surface, and including support means intermediate said upper portion and said lower portion sufficient to permit said forklift to travel from said ground surface to said surface of said platform and from said surface of said platform to said ground surface.

4. A portable cross-dock system, comprising:
  (a) a first platform including a first side that is disposed parallel to a railroad track, adjacent to said railroad track, and sufficiently close to said railroad track to allow access to a railroad car, and wherein said cross-dock system is not disposed at a longitudinal end of said railroad car, and wherein said first platform includes a surface that is disposed above a ground surface, and wherein said first side includes means for adjusting a height of said first side above said ground surface to match the height of a floor of said railroad car, and wherein said first platform includes a second side that is perpendicular with respect to said first side, a third side that is equal in length to said second side and wherein said third side is perpendicular with respect to said first side, and a fourth side that is parallel with respect to said first side and disposed away from said first side by an amount equal to the length of said second side, and wherein any of said second side, said third side, and said fourth side are able to provide an interface for access into an open end of a trailer of the type used with a tractor-trailer by a forklift; and (b) a second platform disposed adjacent to said first platform, said second platform including a surface that is disposed above said ground surface, and wherein said second platform includes four perpendicular sides, one of which is disposed adjacent to either said second side, said third side, or said fourth side of said first platform, and wherein a remainder of any of said four perpendicular sides that are not adjacent to said first platform are able to provide an interface for access into an open end of said trailer by said forklift;

and including means for securing said second platform adjacent to said first platform and wherein said means for securing includes a first attachment member that is attached to said first platform at a location that is disposed under said surface and a second attachment member that is attached to said second platform at a location that is disposed under said surface, and including means for applying a force to said first attachment member and to said second attachment member sufficient to draw said first attachment member and said first platform adjacent to said second attachment member and said second platform; and including a plurality of fixed supports, each of said fixed supports extending vertically down from said first platform and from said second platform, and wherein each of said fixed supports is adapted to distribute the weight of said first platform and said second platform to said ground surface, and including cross-bracing, each of said cross bracing being attached at one end to one of said fixed supports and at another end to a structural member of said first platform or said second platform.

5. The cross-dock system of claim 4 wherein said first platform includes ground support means for supporting the weight of a forklift and a cargo that is being carried by said forklift when said forklift is disposed on said first platform, said ground support means including means for distributing the weight of said first platform to said ground surface, and wherein the weight of said first platform is capable of being carried by said forklift.

6. The cross-dock system of claim 5 wherein said weight of said first platform does not exceed four-thousand pounds.

7. The cross-dock system of claim 5 wherein said second platform includes an area that is adapted to provide access to a rear of a tractor-trailer.

8. The cross-dock system of claim 7 including safety rails disposed around a perimeter of said first platform and said second platform, except for where said first platform and said second platform abut each other and except for a location where access to said railroad car is provided and where access to said rear of said tractor trailer is provided, said safety rails including a raised portion that is disposed above said surface of said first platform that prevents said forklift from driving off of any portion of said first platform that is elevated above said ground surface, and including holes through said surface of said first platform and through said surface of said second platform and including sockets disposed below said holes, and wherein each of said safety rails include a pair of vertical members and wherein each of said vertical members is adapted to pass through one of said holes and to enter into one of said sockets, and wherein each of said safety rails is secured to said cross-dock system without bolts, nuts, or other fasteners.

9. The cross-dock system of claim 5 including a ramp, said ramp disposed adjacent to either said first platform or said second platform and including an upper portion that is disposed at an elevation above said ground surface that is equal to that of said surface of said first platform or said second platform and including a lower portion that is disposed at said ground surface, and including support means intermediate said upper portion and said lower portion sufficient to permit said forklift to travel from said ground surface to said upper portion and from said upper portion to said ground surface.

10. The cross-dock system of claim 9 wherein the weight of said ramp is capable of being carried by said forklift.

11. The cross-dock system of claim 10 wherein said weight of said ramp does not exceed four-thousand pounds.

12. The cross-dock system of claim 4 wherein said means for adjusting a height of said first side above said ground surface includes a plurality of jacks.

13. The cross-dock system of claim 12 wherein said plurality of jacks include a crank and a member that connects said crank to said plurality of jacks sufficient to simultaneously change the height of all of said plurality of jacks when said crank is rotated.

14. The cross-dock system of claim 4 wherein said second platform includes ground support means for supporting the weight of a forklift and a cargo that is being carried by said forklift when said forklift is disposed on said second platform, said ground support means including means for distributing the weight of said second platform to said ground surface, and wherein the weight of said second platform is capable of being carried by said forklift.

15. The cross-dock system of claim 14 wherein said weight of said second platform does not exceed four-thousand pounds.

16. The cross-dock system of claim 4 including an intermediate plate, a first side of said plate being disposed on said first platform and a second side of said plate adapted to be disposed on a floor of said railroad car when said railroad car is disposed adjacent to said cross-k dock system.

17. The cross-dock system of claim 4 wherein said railroad car includes a railroad boxcar.

* * * * *